United States Patent [19]

Miller et al.

[11] 4,281,447

[45] Aug. 4, 1981

[54] DETACHABLE TOOL INTERFACE SYSTEM FOR A ROBOT

[75] Inventors: George J. Miller; George W. Sutter, both of Florissant, Mo.

[73] Assignee: McDonnell Douglas Corporation, St. Louis, Mo.

[21] Appl. No.: 16,353

[22] Filed: Mar. 1, 1979

[51] Int. Cl.³ .............................................. B23Q 3/155
[52] U.S. Cl. ................................ 29/568; 279/1 TS; 279/97; 408/239 R; 409/233
[58] Field of Search ......... 29/568; 408/239 A, 239 R; 414/744 A; 279/87, 97, 1 TS; 409/233

[56] References Cited

U.S. PATENT DOCUMENTS

| 2,145,466 | 1/1939 | Urschel | 279/97 X |
| 3,526,033 | 9/1970 | Saunders | 29/568 |
| 3,791,257 | 2/1974 | Frazier et al. | 279/1 TS |
| 3,823,642 | 7/1974 | Jerue | 409/233 |
| 4,046,263 | 9/1977 | Cwycyshyn et al. | 414/744 A |
| 4,068,559 | 1/1978 | Schmid, Jr. et al. | 409/233 |

FOREIGN PATENT DOCUMENTS 2004481 4/1979 United Kingdom ................. 279/1 TS Primary Examiner—William R. Briggs
Attorney, Agent, or Firm—George W. Finch; Walter J. Jason; Donald L. Royer

[57] ABSTRACT

A mechanical system for allowing removable attachment of tools to a robot which is capable of accommodating positional and angular errors between the tool and the robot during attachment and release of the tool by using tapered attachments.

20 Claims, 6 Drawing Figures

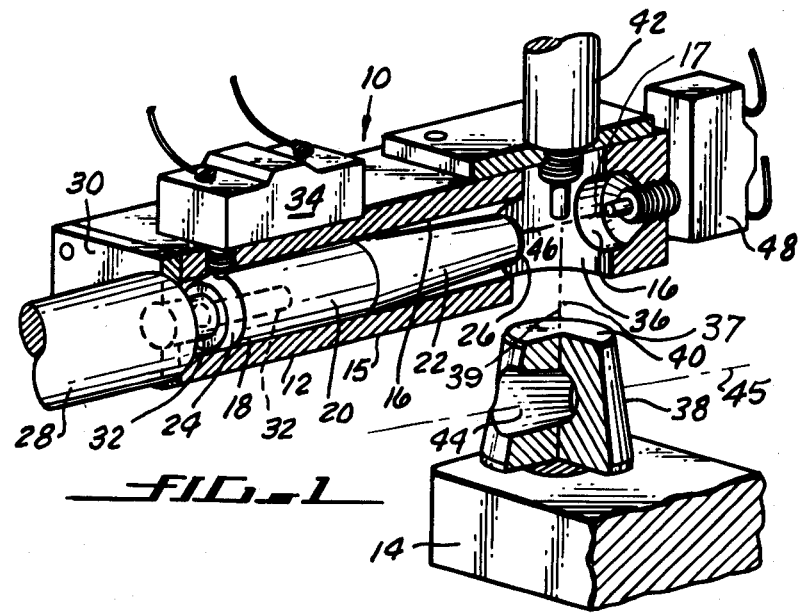
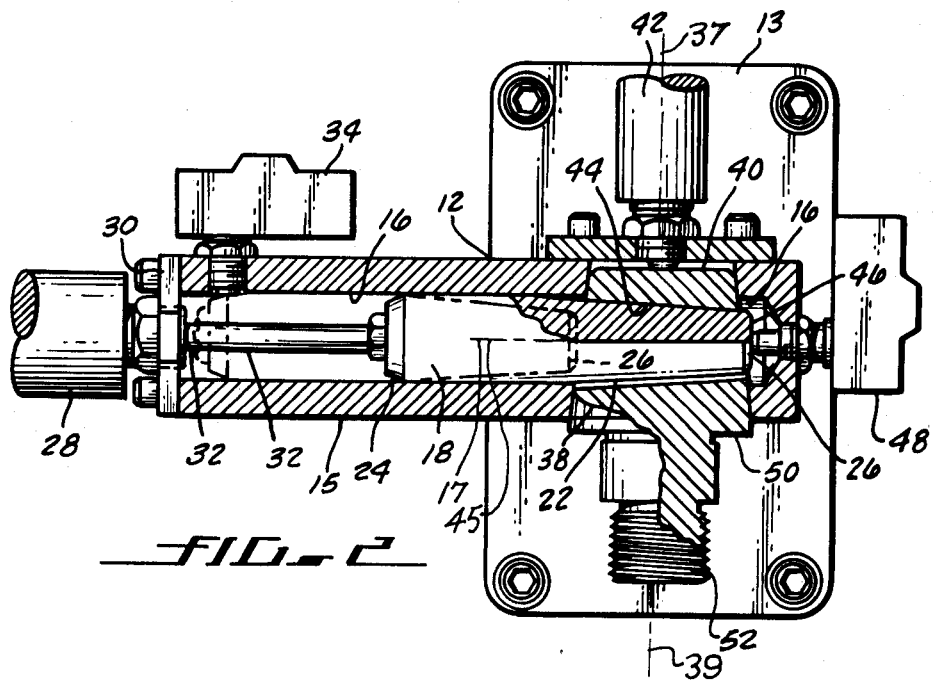

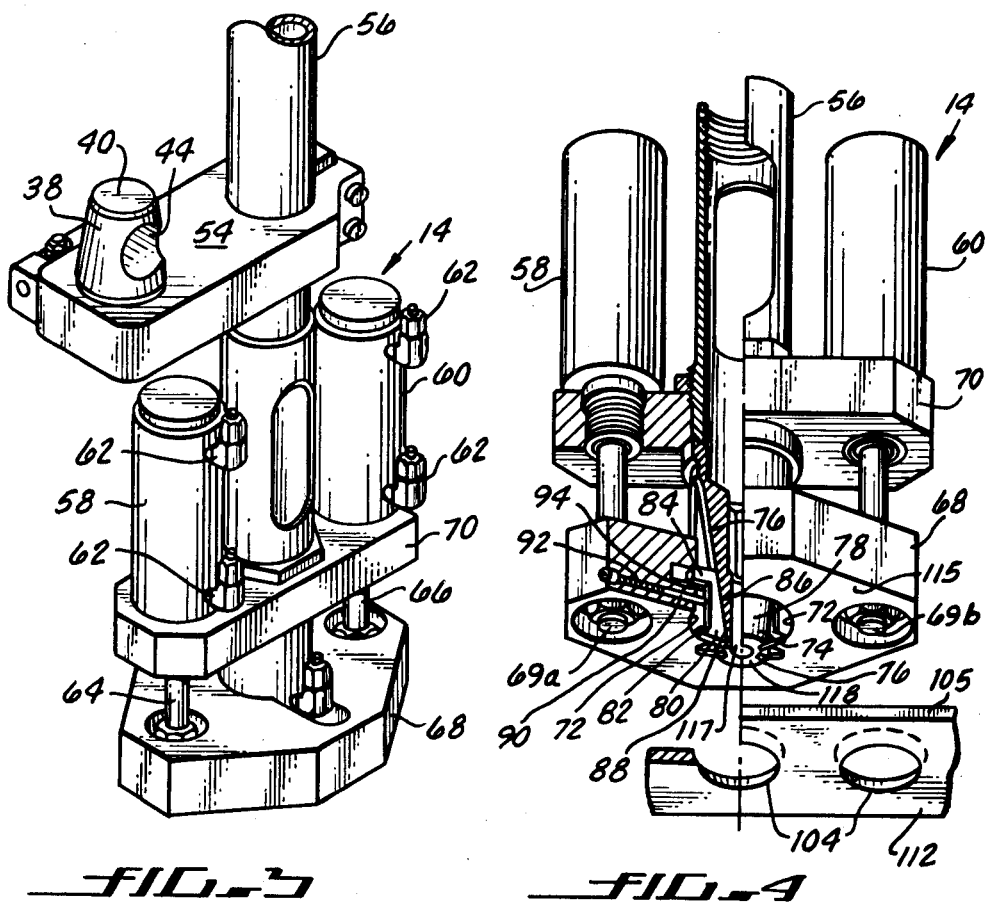

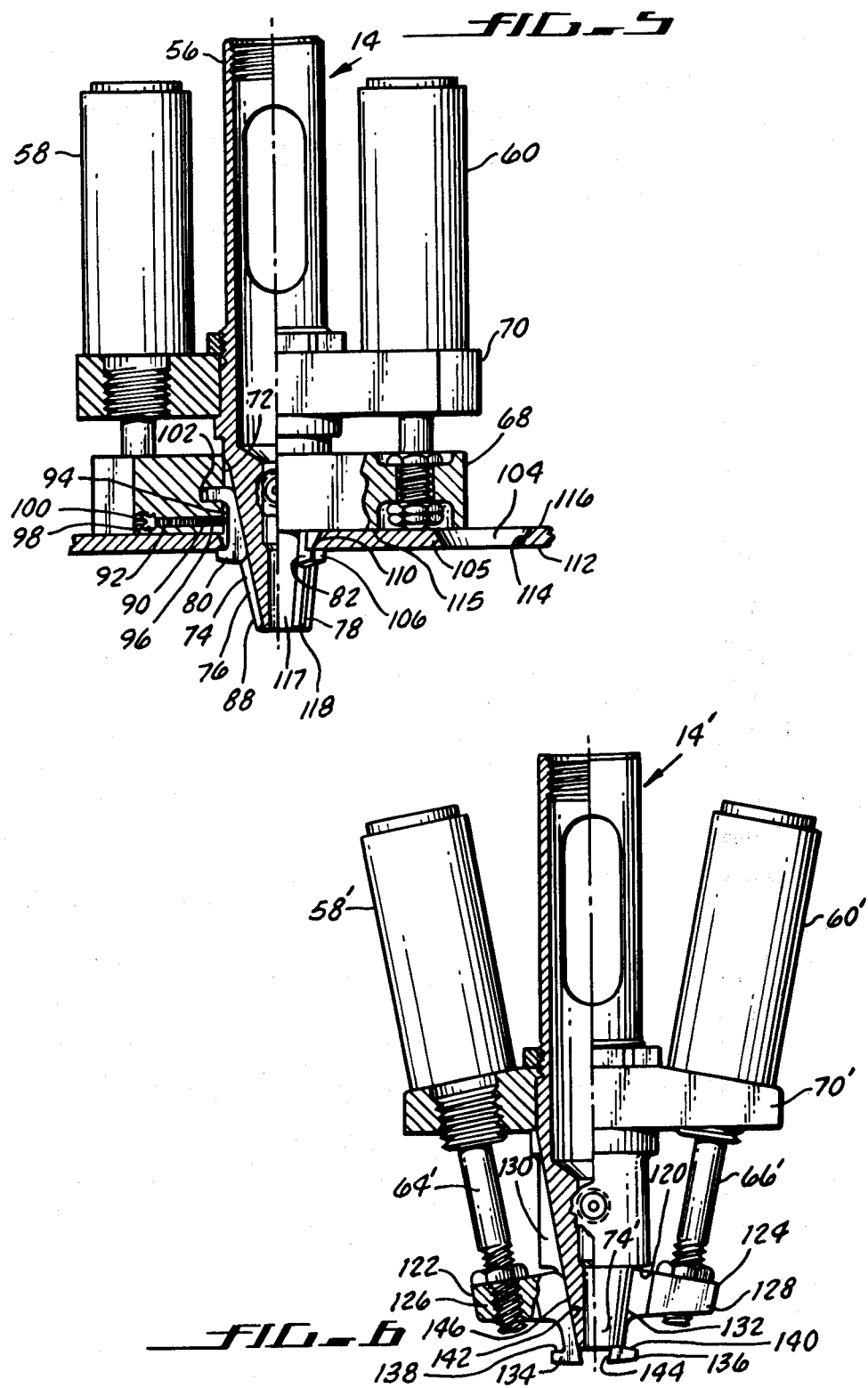

DETACHABLE TOOL INTERFACE SYSTEM FOR A ROBOT

BACKGROUND OF THE INVENTION

Industrial robots are being used in industrial assembly operations in such numbers that their use is becoming common. Initially robots are being assigned to do monotonous mundane or hazardous tasks. For example, the automotive industry, which has the largest number of operating robots, are using them for jobs such as spot welding auto bodies and material handling. The accuracy and repeatability of the presently available robots is ±0.050 inches (±1.25 mm) and is acceptable for tasks of these types. Assembly operations, such as hole preparation and fastener installation, require greater accuracy and repeatability than is now available in industrial robots and few robots have the capability to change the tools which it uses to perform the assembly tasks.

The speed at which robots move can allow a robot to perform many tasks simultaneously with the aid of a computer. In the aerospace industry the products, such as airframes, are characterized by low volume, high complexity assembly operations. The average military aircraft for instance has 450,000 fasteners which must be accurately installed during assembly in differet locations. Therefore, there has been a need to provide an interface system between the available industrial robots and the working tools which system can accommodate the inaccuracies of the robot and yet provide the desired accuracy, repeatability and speed to make use of the robot economic. At the same time, since in industries like the aerospace industry, many different operations may have to be performed simultaneously by a robot, the interface system must provide the capability to change tools as required.

BRIEF DESCRIPTION OF THE PRESENT INVENTION

The present interface system allows a robot to pick up and place assembly equipment, tools and fixtures, and to compensate for positioning errors up to ±0.20 inches (5 mm) in any direction and angular errors of about ±4°. The present interface is designed to be used with any industrial robot used in pick and place operations where multiple tools are used with fixtures having precise locators for producing interchangeable parts for assemblies.

The present invention includes a hand assembly which utilizes a pair of tapered interfaces at right angles to each other to grip a tool holding assembly. The tool holding assembly is one adapted to position drills on a drill blanket and is shown as a novel assembly typical of tool holding assemblies that are possible. The hole locations in the drill blanket are tapered to allow a tapered portion of the tool holding assembly to guide its way into the drill blanket hole thus compensating for inaccuracy of position created by the robot positioning it. As the robot forces the tool holding assembly into the tapered hole of the drill blanket, locking ears engage the drill blanket to secure the tool holding assembly in correct position. The hand assembly then releases the tool holding assembly so that it is free to pick up and place other equipment or perform other operations while the first assembly is performing its designated operation. The tapered interfaces between the hand assembly and the tool holding assembly enable accommodation of inaccuracies when the robot comes back to remove the tool holding assembly from the drill blanket.

Although a single hand assembly and a tool holding assembly primarily adapted for drilling is shown, the present invention can be used to interface multiple robot hands in quick change fashion with any robot or multiple robots. It provides a universal interface between the robot and its tools, with the tools being positioned by the robot to accomplish their assigned tasks. Examples of such tasks can be the fastener hole preparation as described herein, or fastener installation may be performed by attaching the tool holding assembly to installation tools such as nutrunners, screwdrivers, impact wrenches, rivet guns or special purpose tools. For material handling various gripers can be fitted to the tool holding assembly. In this manner the present invention can become an industry standard interface between robots and their tools whose use is limited only by the engineer's imagination for their utilization.

It is therefore an object of the present invention to provide a robot to tool interface system capable of compensating for various inaccuracies between the robot and the desired workpiece.

Another object is to provide a robot-tool interface which can be used with a wide variety of material handling, fabrication and assembly tools.

Another object is to reduce the expense of manufacture for complex parts in relatively small manufacturing runs.

Another object is to provide a relatively easy to manufacture, economical and reliable interface between a robot and its tools.

These and other objects and advantages of the present invention will become apparent to those skilled in the art after considering the following detailed specification which discloses preferred embodiments thereof in conjunction with the accompanying drawings.

BRIEF DESCRIPTION OF THE DRAWINGS

FIG. 1 is a cutaway perspective view of the hand assembly portion of the present invention disconnected from the adapter for the tool holding assembly thereof;

FIG. 2 is a side view partially in cross-section showing a portion of the tool holding assembly in position in the hand assembly in both the locked and unlocked positions thereof;

FIG. 3 is a perspective view of the tool holding assembly adapted to attach an automatic feeding drill to a drill blanket;

FIG. 4 is a partial cross-sectional underside view of the assembly of FIG. 3 in position to engage the drill blanket;

FIG. 5 is a side view of the tool holder assembly, partially in cross-section, the assembly being in engagement with a drill blanket; and FIG. 6 is a cross-sectional view similar to FIG. 5 of a modified version of the tool holding assembly of the present invention.

DETAILED DESCRIPTION OF THE SHOWN EMBODIMENTS

Referring to the drawings more particularly by reference numbers, number 10 in FIG. 1 refers to a detachable robotic interface system constructed according to the present invention. The system 10 includes a hand assembly 12 and a tool holding assembly 14, only a portion of which is shown. The hand assembly 12 normally is attached permanently to the arm of the robot (not shown) by a mounting plate 13 and includes a body 15 having a cylindrical bore 16 formed longitudinally therethrough about axis 17. A lock pin 18 is positioned within the cylindrical bore 16, the pin 18 having a cylindrical portion 20 adapted to slide in the bore 16. A frustro-conical portion 22 having a slight taper is provided on the pin 18 adjacent to the cylindrical portion 20, whereas tapered lead-ins 24 and 26 are provided on the opposite ends of the pin 18. A linear driver, such as the pneumatic cylinder 28, is connected to one end 30 of the body 15 having an actuator rod 32 connected to the lock pin 18, so that it can be moved longitudinally in the cylindrical bore 16, by suitable control of the pneumatic cylinder 28.

In FIG. 1, the lock pin 18 is shown in the tool holding assembly receiving position with its back tapered lead-in 24 actuating an electrical switch 34 which is used to electrically indicate to the robot the retracted position of the lock pin 18.

The body 15 also includes a tapered bore 36 about axis 37 which intersects the cylindrical bore 16 at a right angle so that the lock pin 18, when properly actuated, can extend thereacross. The tapered bore 36 is adapted to receive a frustro-conical member 38 having an axis 39 connected to the tool holding assembly 14. The tapered nature of the bore 36 and the frustro-conical member 38 enables the robot to place the two into engagement with relatively little precision since the wedging action therebetween guides the two assemblies 12 and 14 together. When the robot places the two assemblies 14 and 16 together, the top 40 of the frustro-conical member 38 engages a switch 42 which electrically indicates the position of the member 38 to the robot. Thereafter, the controls for the robot cause the pneumatic cylinder 28 to be actuated, driving the lock pin 18 into a tapered bore 44 having an axis 45 formed through the member 38 at a right angle to the bore 36, and generally in alignment with the lock pin 18. The tapered portion 22 of the pin 18 wedges into the tapered bore 44 to complete the locking of the tool holding assembly 14 to the hand assembly 12. The tapered portion 22 and the tapered bore 44 can accommodate a relatively large amount of positional and rotative inaccuracy like the mating tapered portions 36 and 38. The pin 18 is driven through the member 38 until its end 46 contacts a switch 48 which electrically indicates to the controls of the robot that in fact the hand assembly 12 is locked to the tool holding assembly 14.

When it is time to release the tool holding assembly 14 from the hand assembly 12, the opposite operations take place with the pneumatic cylinder 28 withdrawing the pin 18 from the frustro-conical member 38, the switches 48 and 34 indicating such to the control for the robot, the robot moving the hand assembly 12 away from the frustro-conical member 38, and the switch 42 indicating such removal has been successful to the controls of the robot.

The frustro-conical member 38 includes a bottom abutment surface 50 which in combination with connection means, such as the threaded stud 52, enable relatively permanent attachment thereof to the tool holding assembly 14.

A tool holding assembly 14 adapted for use with an automatic drill motor is shown in FIGS. 3, 4 and 5, in which the frustro-conical member 38 is attached to a sidewardly extending clamp member 54 which is clamped to a support housing 56 for the drill motor (not shown). The clamp member 54 is merely illustrative of a device used to attach the frustro-conical member 38 to the tool holding assembly 14 and such may be located at various angles and positions therefrom as long as the adapter, such as the clamp member 54, is relatively rigid.

The assembly 14, as shown in FIGS. 3, 4 and 5, include a pair of pneumatic cylinders 58 and 60 which are connected to suitably controlled sources of pneumatic pressure by the fittings 62, and are ultimately controlled by the robot's computer. The cylinders 58 and 60 include an actuator rod 64 and 66 respectively whose outer ends 69a and 69b are connected to a slide block assembly 68. Since the pneumatic cylinders 58 and 60 are mounted on a similar mounting plate 70 connected to the housing 56, actuation of the pneumatic cylinders 58 and 60 causes the slide block assembly 68 to move toward and away from the mounting plate 70.

When the tool holding assembly 14 is in use and disengaged from a workpiece, it is maintained in the condition shown in FIG. 4 with the actuator rods 64 and 66 extended. The slide block assembly 68 contains a central bore 72 through which a tapered nipple 74 extends, the nipple 74 being fixedly connected to the housing 56 and the mounting plate 70. The nipple 74 includes a plurality of channels 76 in the frustro-conical outer surface 78 thereof. Each of the channels 76 has a slider member 80 retained therein, the slider members 80 each having a workpiece engaging tooth 82 and a retaining tooth 84 extending away from an inward slider surface 86. The inward slider surface 86 is matched in angle to engage the bottom surface 88 of the channel 76 while maintaining the sideward extension of the teeth 82 and 84. The inward slider surface 86 is maintained in engagement with the bottom surface 88 by means of a pin 90 biased by a spring 92 against an outward side surface 94 of the member 80 which faces generally oppositely from the inward slider surface 86. The pin 90 and the spring 92 are retained in a bore 96 in the slide block assembly 68 which is closed at its outer end 98 by suitable means such as screw 100. Each of the slider members 80 are also restrained to move with the slide lock assembly 68 along the nipple channels 76 by suitable orifices 102 in which the retainer teeth 84 extend and slide inwardly and outwardly as the nipple 74 moves with respect to the slide block assembly 68.

In operation, the robot places the nipple 74 with its slider members 80 into one of the tapered holes 104 of a drill blanket 105. Then as the nipple 74 is forced downwardly into the blanket holes 104, which are tapered to assure that the outwardly extending ends 106 of the workpiece engaging teeth 82 are able to extend through the drill blanket 105 eventhough misaligned therewith. The nipple 74 is then forced downwardly as the pneumatic cylinders 58 and 60 retract the slide block assembly 68, which has the effect of sidewardly moving the slide members 80 until the inside edges 110 of the teeth 82 engage the underside 112 of the drill blanket 105, and the outward slider surface 94 engages the inside surface 114 of the tapered holes 104. This action locks the tool holding assembly 14 in proper position in the drill blanket 105 with the undersurface 115 of the slide block assembly 68 in engagement with the outer surface 116 of the drill blanket 68. Thereafter, the tool, such as an automatic feed drill motor, (not shown) can be energized, a passageway 117 being provided centrally through the nipple 74 so that a drill can be extended therethrough. At this point, the robot would normally release the tool holding assembly 14 by causing the hand assembly 12 to disengage member 38 and move to some other tool holding assembly 14 to reposition it for continued operations on the workpiece. When the operation of the tool is completed, the robot re-engages the hand assembly 12 with a tool holding assembly 14, extends the actuator rods 64 and 66 to slide the slider members 80 toward the end 118 of the nipple 74 to thereby retract the teeth 82 inwardly and release the tool holding assembly 14 from the drill blanket 105.

In FIG. 6, a modified form 14' of the tool holding assembly 14 is shown. Similar components are identified by the same numbers used above with a prime (') added thereto. In the embodiment of FIG. 6 the drill blanket 105 is drawn up against a radial abutment surface 120 on the nipple 74' instead of being brought up into abutment with the underside 115 of the slide block assembly 68. This is accomplished by providing a pair of modified slider members 122 and 124 whose portions corresponding to the retaining teeth 84 on the slider member 80 are extended coupling lips 126 and 128 to which the rods 64' and 66' of the actuators 58' and 60' are threadably connected. The slider members 122 and 124 slide in oppositely positioned channels 130 and 132 in the nipple 74' in response to actuation of the actuators 58' and 60' so that the retaining teeth 134 and 136 thereof expand as they are drawn toward the abutment surface 120. In this manner, they can be inserted into the holes 104 in the drill blanket 105 so that they lock the drill blanket 105 between the abutment surface 120 and the upper edges 138 and 140 of the teeth 134 and 136. It should be noted that the pneumatic cylinders 58' and 60' are canted to be parallel with their respective channels 130 and 132 since the rods 64' and 66' thereof are the means which retain the slider members 122 and 124 therein with their innermost sliding surfaces 142 and 144 bearing on the inner surface 146 of the channels 130 and 132.

With an interface system 10 as above described, it is possible to have a robot performing many functions at a time, using the time required for operation on the workpiece to move to other tool holding assemblies and reposition or readjusting for further work. Therefore, there has been shown and described novel interface means for applying various tools to one or more workpieces by means of a robot which fulfill all the objects and advantages sought therefor. Many changes, modifications, variations, uses and applications of the subject system will become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

What is claimed is:

1. An interface to enable the removable attachment of at least one operator device to a machine, said interface including:
    a body defining a frustro-conical surface therein having an axis and a cylindrical surface therein having an axis perpendicular to said frustro-conical surface axis;
    an attachment member having an outer frustro-conical surface with an axis, said outer frustro-conical surface being shaped and sized to mate with said frustro-conical surface of said body, said attachment member also defining a second frustro-conical surface therein having an axis perpendicular to said outer frustro-conical surface axis;
    a pin having a cylindrical portion and a frustro-conical portion, said cylindrical portion being positioned and sized to slide along said cylindrical surface to said body and said frustro-conical portion being shaped and sized to mate with said second frustro-conical surface of said attachment member;
    means to move said pin frustro-conical portion into and out of engagement with said second frustro-conical surface of said attachment member;
    means to attach said body to the machine; and
    means to attach said attachment member to the operator device.

2. The interface as defined in claim 1 wherein said body includes sensor means to signal at least one position of said pin on said cylindrical surface of said body.

3. The interface as defined in claim 2 wherein said sensor means include means to signal the position of said pin when said pin frustro-conical portion is in mating engagement with said frustro-conical surface of said attachment member and to signal when said pin frustro-conical portion is disengaged out of the area defined by said second frustro-conical surface of said attachment member.

4. The interface as defined in claim 2 wherein said sensor means include means to signal placement of said outer frustro-conical surface of said attachment member within the area defined within said frustro-conical surface of said body.

5. The interface as defined in claim 4 wherein said sensor means include at least one mechanically actuated electrical switch positioned on said body to be contacted by said attachment member.

6. The interface as defined in claim 1 wherein said frustro-conical surface axis and said cylindrical surface axis of said body are generally at a right angle to each other and said second frustro-conical surface of said attachment member is generally at a right angle to said outer frustro-conical surface axis thereof.

7. An interface to enable the removable attachment of at least one operator device to a machine, said interface including:
    a body defining a frustro-conical surface therein having an axis and a cylindrical surface therein having an axis;
    an attachment member having an outer frustro-conical surface with an axis, said outer frustro-conical surface being shaped and sized to mate with said frustro-conical surface of said body, said attachment member also defining a second frustro-conical surface therein having an axis;
    a pin having a cylindrical portion and a frustro-conical portion, said cylindrical portion being positioned and sized to slide along said cylindrical surface of said body and said frustro-conical portion being shaped and sized to mate with said second frustro-conical surface of said attachment member;
    means to move said pin frustro-conical portion into and out of engagement with said second frustro-conical surface of said attachment member;
    means to attach said body to the machine; and
    means to attach said attachment member to the operator device, said attachment member further including at least one operator device holding assembly for removable engagement with a blanket having operator device locating orifices defined therein, said assembly including:

means to hold the operator device;

frustro-conical nipple with a smaller end sized and shaped to be inserted in the operator device locating orifices defined in the blanket, said frustro-conical nipple having an outer frustro-conical surface and at least two channels formed in said outer frustro-conical surface thereof; and at least two slider members positioned in said channels, said slider members having an outwardly extending hook adapted to engage the blanket after said frustro-conical nipple smaller end has been inserted in a operator device locating orifice defined therein when said slider members are moved away from said smaller end of said frustro-conical nipple.

8. The interface as defined in claim 7 wherein said operator device holding assembly includes:

means to controllably move said slider members in said channels with respect to said frustro-conical nipple.

9. The interface as defined in claim 8 wherein said channels formed in said outer frustro-conical surface in general alignment with said axis thereof.

10. The interface as defined in claim 8 wherein said means to controllably move said slider members in said channels with respect to said frustro-conical nipple include a pair of pneumatic cylinders operatively connected between said frustro-conical nipple and said slider members.

11. The interface as defined in claim 10 wherein said operator device holding assembly includes a slide block assembly connected to be moved by said pneumatic cylinders, said slide block assembly having a cylindrical surface defining a hole therethrough through which said frustro-conical nipple extends and at least two retaining orifices which extend outwardly into said slide block from said slide block cylindrical surface, said slider members further include retaining teeth which are positioned in said retaining orifices.

12. The interface as defined in claim 11 wherein said channels each include a bottom surface and side surfaces adjacent thereto, said slide block includes bias means positioned to bear against said slider members, and said slider members each include a back slide surface which is held in engagement with said channel bottom surface by said bias means.

13. The interface as defined in claim 12 wherein said slider members each include an abutment surface between said hook and said retaining tooth thereof, said bias means including a spring and a pin biased by said spring to bear against said abutment surface.

14. The interface as defined in claim 10 wherein said body includes sensor means to signal at least one position of said pin on said cylindrical surface of said body.

15. The interface as defined in claim 14 wherein said sensor means include means to signal the position of said pin when said pin frustro-conical portion is in mating engagement with said frustro-conical surface of said attachment member and to signal when said pin frustro-conical portion is disengaged out of the area defined within said second frustro-conical surface of said attachment member.

16. The interface as defined in claim 14 wherein said sensor means include means to signal placement of said outer frustro-conical surface of said attachment member within the area defined within said frustro-conical surface of said body.

17. The interface as defined in claim 16 wherein said sensor means include at least one mechanically actuated electrical switch positioned on said body to be contacted by said attachment member.

18. The interface as defined in claim 10 wherein said slide block includes and abutment surface thereon adjacent the orifice defined therethrough, said abutment surface being positioned to engage the blanket when said hooks are engaged with said blanket.

19. The interface as defined in claim 10 wherein said nipple includes a frustro-conical surface sized to engage with the orifices of the blanket.

20. The interface as defined in claim 10 wherein said nipple includes an axial bore therethrough through which a portion of the operator device can extend.

* * * * *